United States Patent [19]

Nishimura

[11] Patent Number: 4,848,545
[45] Date of Patent: Jul. 18, 1989

[54] ELECTROMAGNETICALLY CONTROLLED SPRING CLUTCH MECHANISM

[75] Inventor: Kozo Nishimura, Akashi, Japan

[73] Assignee: Mita Industrial Co., Ltd., Osaka, Japan

[21] Appl. No.: 95,975

[22] Filed: Sep. 14, 1987

[30] Foreign Application Priority Data

Sep. 30, 1986 [JP] Japan .................................. 61-229817

[51] Int. Cl.4 ...................... F16D 13/02; F16D 13/08; F16D 27/00
[52] U.S. Cl. .................................. 192/26; 192/33 C; 192/35; 192/81 C; 192/84 PM; 192/84 T
[58] Field of Search ............ 192/26, 35, 81 C, 84 PM, 192/84 T, 40, 33 C, 12 BA

[56] References Cited

U.S. PATENT DOCUMENTS

| | | | |
|---|---|---|---|
| 3,185,276 | 5/1965 | Sajoree, Jr. .................... | 192/81 C X |
| 3,637,056 | 1/1972 | Baer ................................ | 192/12 BA |
| 3,905,458 | 9/1975 | Mehrbrodt ....................... | 192/26 |
| 4,502,578 | 3/1985 | Koyama .......................... | 192/26 |
| 4,570,768 | 2/1986 | Nishimura et al. .............. | 192/35 |

Primary Examiner—Rodney H. Bonck
Assistant Examiner—Richard M. Lorence
Attorney, Agent, or Firm—Beveridge, DeGrandi & Weilacher

[57] ABSTRACT

An electromagnetically controlled spring clutch mechanism comprising a first boss member rotatable as a unit with an input rotating element, a second boss member rotatable as a unit with an output rotating element, a coil spring fitted over and across the first and second boss members, a rotation control member for hampering contraction of the coil spring, a movable member, a magnet for biasing the movable member magnetically toward the rotation control member, and an electromagnet for magnetically attracting the movable member away from the rotation control member. When the electromagnet is energized, the movable member moves away from the rotation control member to permit contraction of the coil spring member, and the contraction of the coil spring effects a driving connection between the first and second boss members.

9 Claims, 1 Drawing Sheet

ELECTROMAGNETICALLY CONTROLLED SPRING CLUTCH MECHANISM

FIELD OF THE INVENTION

This invention relates to an electromagnetically controlled spring clutch mechanism for selectively transmitting a driving force by utilizing contraction of coil spring means.

DESCRIPTION OF THE PRIOR ART

Electromagnetically controlled spring clutch mechanisms utilizing coil spring means have been widely used to transmit the rotating driving force of an input rotating element selectively. One example of a clutch mechanism of this type is shown, for example, in Japanese Laid-Open Patent Publication No. 175633/1984. The present applicant previously proposed an improvement in the above known clutch mechanism in the specification and drawings of Japanese Patent Application No. 78439/1985 (entitled: ELECTROMAGNETICALLY CONTROLLED SPRING CLUTCH MECHANISM). This improved electromagnetically controlled spring clutch mechanism comprises a rotor adapted to rotate as a unit with a shaft member (output rotating element), an armature positioned opposite to the rotor, a rotating supporting member mounted rotatably on the shaft member, a biasing spring member interposed between the armature and the rotating supporting member for elastically moving the armature away from the rotor, electromagnetic means for magnetically attracting the armature to the rotor against the elastic action of the biasing spring member, a first boss member adapted to rotate as a unit with an input rotating element such as a gear, a second boss member adapted to rotate as a unit with the shaft member, and coil spring means fitted over and across the first and second boss members and connected at one end to the input rotating element and at the other end to the rotating supporting member. When the electromagnetic means is energized, the armature is magnetically attracted to the rotor by the magnetic means. As a result, a relative speed difference arises between the input rotating element and the rotating supporting member to cause contraction of the coil spring means. Consequently, the first and second boss members are drivingly connected via the coil spring means. On the other hand, when the electromagnetic means is deenergized, the armature is moved back to the original position by the elastic biasing action of the biasing spring member, and contraction of the coil spring means is cancelled. As a result, the driving connection of the first and second boss members via the coil spring means is cancelled.

Since, however, the above electromagnetically controlled spring clutch mechanism is constructed such that the armature and the rotor are brought into connection when the electromagnetic means is energized, and consequently, the driving force is transmitted, it is difficult to control the mechanism accurately so that the shaft member is rotated through a predetermined angle. To rotate the shaft member through a predetermined angle, for example, through 180 degrees, it is in principle sufficient to deenergize the electromagnetic means when the shaft member has rotated through the predetermined angle. However, even when this is done, it is difficult to detect the rotating angle of the shaft member accurately. Moreover, owing to the response characteristics of the clutch itself, the shaft member is difficult to rotate accurately through the predetermined angle.

There also exists a spring clutch mechanism in which a shaft member constituting an output rotating element is adapted to rotate through a predetermined angle. This spring clutch mechanism is comprised of a combination of spring clutch means and actuation control means annexed to it. The spring clutch means comprises a first boss member adapted to rotate as a unit with an input rotating element such as a gear, a second boss member adapted to rotate as a unit with a shaft member, coil spring means fitted over and across the first and second boss members, and a ratchet wheel having a pawl portion and mounted rotatably over the coil spring means, one end of the coil spring means being connected to the ratchet wheel and the other end thereof being connected to the second boss member. The actuation control means includes an actuation control member having an engaging claw engageable with the pawl portion of the ratchet wheel and actuating means such as an electromagnetic solenoid for actuating the actuation control member. When in this spring clutch mechanism, the actuating means is in the deenergized state and the engaging claw of the actuation control member is in engagement with the pawl portion of the ratchet wheel, rotation of the ratchet wheel incident to the input rotating element is surely hampered and thereby contraction of the coil spring means is hampered. Consequently, the first and second boss members are not drivingly connected via the coil spring means. However, when the actuating means is energized and the engaging claw and the pawl portion of the ratchet wheel are disengaged, rotation of the ratchet wheel incident to the rotation of the input rotating element is permitted and thereby the coil spring means is contracted. As a result, the first and second boss members are drivingly connected via the coil spring means.

The spring clutch mechanism of this construction, however, requires a relatively large installation space for the spring clutch means and the actuation control means. Another problem is that it is difficult to preset the relative positions of the spring clutch means, particularly the pawl of the ratchet wheel, and the actuation control means, particularly the engaging claw of the actuation control member, exactly as is required.

SUMMARY OF THE INVENTION

It is a primary object of this invention to provide an excellent electromagnetically controlled spring clutch mechanism which is free from the aforesaid problem and with a relatively simple structure, the driving force of an input rotating element can be transmitted as is required to an output rotating element.

Another object of this invention is to provide an excellent electromagnetically controlled spring clutch mechanism of compacted size which can be installed easily. According to this invention, there is provided an electromagnetically controlled spring clutch mechanism for transmitting the rotating driving force of an input rotating element selectively to an output rotating element, said mechanism comprising a first boss member adapted to rotate as a unit with the input rotating element, a second boss member disposed adjacent to the first boss member and adapted to rotate as a unit with the output rotating element, coil spring means fitted over and across the first and second boss members and adapted to connect said boss members drivingly by its contraction, a rotation control member which is attached to one end of the spring for hampering rotation which would cause contraction of the coil spring means, a movable member mounted adjacent to the rotation control member so that it can move freely toward and away from the rotation control member, magnetic means for magnetically biasing the movable member toward the rotation control member, and electromagnetic means for magnetically attracting the movable member away from the rotation control member; wherein when the electromagnetic means is in the deenergized state, the movable member acts on the rotation control member by the magnetic biasing action of the magnetic means to hamper rotation of the rotation control member and thereby contraction of the coil spring means, and when the electromagnetic means is energized, the movable member is moved away from the rotation control member by the magnetic attracting action of the electromagnetic means to permit rotation of one end of the spring with the rotation control member and thereby contraction of the coil spring means.

DETAILED DESCRIPTION OF PREFERRED EMBODIMENTS

With reference to the accompanying drawings, one embodiment of the electromagnetically controlled spring clutch mechanism constructed in accordance with this invention will be described below in detail. In the following embodiment, the electromagnetically controlled spring clutch mechanism will be described as it is applied to the controlling of conveyor rollers for paper conveyance in an electrostatic copying machine. The spring clutch mechanism of the invention, however, is not limited to this embodiment, and can be applied to the controlling of other various rotating members.

Figure 1:
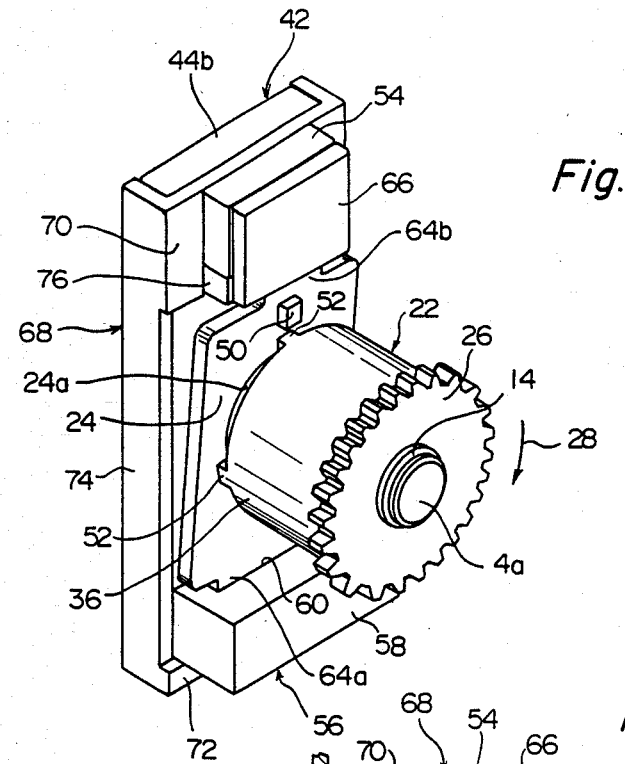
FIG. 1 is a perspective view showing one embodiment of the electromagnetically controlled spring clutch in accordance with this invention; an FIG. 2 is a sectional view of one example in which the electromagnetically controlled spring clutch mechanism is applied to the control of conveyor rollers in an electrostatic copying machine.
Figure 2:
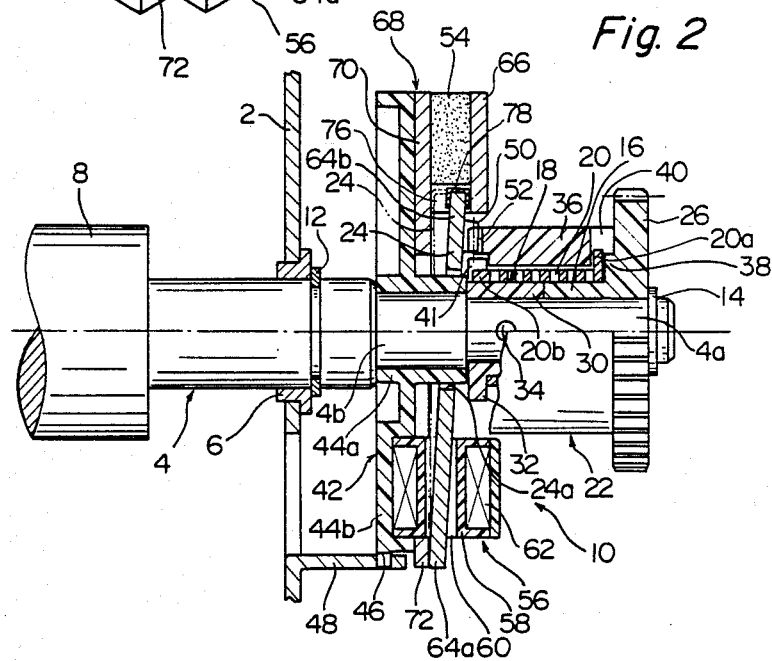

With reference to FIGS. 1 and 2, mainly to FIG. 2, a pair of vertical base plates 2 (for example the vertical base plates of the electrostatic copying machine, and FIG. 2 shows one of them) are disposed in spaced-apart relationship in the left-right direction in FIG. 2. A shaft member 4 constituting an output rotating element is rotatably mounted via a bearing 6 between the pair of vertical base plates 2 (FIG. 2 shows only one end portion of the shaft member 4). A conveyor roller 8 for conveying copying paper, for example, is mounted on an intermediate portion in the shaft member 4. The right end portion in FIG. 2 of the shaft member 4 projects to the right, namely outwardly, through the vertical base plate 2, and an electromagnetically controlled spring clutch mechanism 10 in accordance with this invention is mounted on this projecting end portion. Hence, when the clutch mechanism 10 is in connection, a driving force from a driving source (not shown) is transmitted to the shaft member 4 via the clutch mechanism 10, and the conveyor roller 8 rotates as a unit with the shaft member 4. In the illustrated embodiment, a stop member 12 is secured to that part of the shaft member 4 which is outwardly of the mounting position of the bearing 6 in order to prevent the shaft member 4 and the bearing 6 from coming out of place, and a stop member 14 is also secured to that part of the shaft member 4 which is upward of the mounting position of the clutch mechanism 10, namely to the right end of the shaft member 4 in FIG. 2, in order to prevent disengagement of the clutch mechanism 10 from the shaft member 4.

The illustrated electromagnetically controlled spring clutch mechanism 10 is provided with a first boss member 16, a second member 18, coil spring means 20, a rotation control member 22 and a movable member 24. A small-diameter portion 4a is provided in the right end portion of the shaft member 4, and a gear 26 constituting an input rotating element is rotatably mounted on the small-diameter portion 4a. The first boss member 16 is disposed on the left side of the gear 26 in FIG. 2. In the illustrated embodiment, the cylindrical first boss member 16 is provided integrally on the left surface of the gear 26 and rotates as a unit with the gear 26. The first boss member 16 extends toward the second boss member 18 to the left in FIG. 2. It is possible, if desired, to form the first boss member 16 as a separate member from the gear 26 and fix it to the left surface of the gear 26 by a bolt or the like. Although not shown in the drawings, the gear 26 is drivingly connected to a driving source such as an electric motor via a suitable gear mechanism or the like, and rotated in the direction of an arrow 28 (FIG. 1) by the driving source.

The second boss member 18 is disposed on the left side adjacent to the first boss member 16. The illustrated second boss member 18 has a cylindrical boss portion 30 and an annular flange portion 32 provided on the left end of the boss portion 30. The second boss member 18 is mounted on the small-diameter portion 4a of the shaft member 4 so as to rotate as a unit with it by mounting a pin member 34 through a pair of pin holes formed in the boss portion 30 and a through-hole formed in the small-diameter portion 4a If desired, the second boss member 18 may be formed integrally in the shaft member 4.

The coil spring means 20 is fitted over and across the first boss member 16 and the second boss member 18. The boss portion 30 of the second boss member 18 extends to the right in FIG. 2 toward the first boss member 16, and the facing end surfaces of the two boss members are kept in contact with or proximity to each other. The outside diameter of the boss portion 30 of the second boss member 18 is substantially equal to the outside diameter of the first boss member 16, and the coil spring means 20 is fitted over and across the first boss member 16 and the boss portion 30 of the second boss member 18. The rotation control member 22 is further rotatably mounted over the coil spring means 20. The rotation control member 22 is constructed of a hollow sleeve member 36. In the illustrated embodiment, enlarged inside diameter portions having a slightly larger inside diameter are formed in the inner circumferential surfaces of both ends of the hollow sleeve member 36. One of the enlarged inside diameter portions (the right enlarged inside diameter portion in FIG. 2) is rotatably supported on a protruding portion 38 provided on the aforesaid one surface of the gear 26, and the other enlarged inside diameter portion (the left enlarged inside diameter portion in FIG. 2) is rotatably mounted on the annular flange portion 32 of the second boss member 18. In relation to the rotation control member 22, one end 20a of the coil spring means 20 is engaged with a cut 40 formed at one end, i.e., the right end, of the hollow sleeve member 36, and its other end 20b is engaged with a cut 41 formed in the annular flange portion 32 of the second boss member 18. The coil spring means 20 is wound from one end 20a to the other end 20b left-handedly as viewed from left in FIG. 2 (i.e., in a direction in which the coil spring means 20 contracts when the rotation control member 22 is rotated incident to the rotation of the gear 26 in the direction of arrow 28).

The movable member 24 is disposed on the left of the second boss member 18 and the rotation control member 22 in FIG. 2. A medium-diameter portion 4b having a slightly larger diameter than the small-diameter portion 4a is formed in the shaft member 4 at a site left of the small-diameter portion 4a in FIG. 2, and a supporting member 42 is mounted on the medium-diameter portion 4b so that it rotates relative to the medium-diameter portion 4b, and the movable member 24 is mounted on the supporting member 42. The supporting member 42 has a cylindrical sleeve portion 44a mounted rotatably on the medium-diameter portion 4b of the shaft member 4 and a rectangular main body portion 44b formed as a one-piece unit with the cylindrical sleeve 44a, and a cut 46 is formed at one end (the lower end in FIG. 2) of the main body portion 44b. Part of the vertical base plate 2 is bent to the right in FIG. 2 to form an engaging portion 48 which is received in the cut 46 formed in the main body portion 44b. Hence, it will be easily understood that the supporting member 42 is not rotated substantially, and the shaft member 4 is rotated with respect to the supporting member 42. The movable member 24 is constructed of a nearly rectangular plate member formed of a magnetic material. A circular opening 24a is formed centrally in the movable member 24, and the cylindrical sleeve portion 44a of the supporting member 42 is positioned in the circular opening 24a. One surface, i.e. the right surface in FIG. 2, of the movable member 24 has provided therein a first claw member 50 projecting to the right. In the illustrated embodiment, the first claw member 50 is fixed to the one surface of the movable member 24 by an adhesive. If desired, it may be formed as a one-piece unit with the movable member 24 by lost wax process, press-forming, etc. In relation to the first claw member 50, a second claw member 52 capable of engaging the first claw member 50 is provided in the rotation control member 22. In the illustrated embodiment, the four second claw members 52 are provided at substantially equal intervals in the circumferential direction on the end surface (the left end surface in FIG. 2) of the hollow sleeve member 36 which faces the aforesaid one surface of the movable member 24. These second claw members 52 project toward the aforesaid one surface of the movable member 24. In the illustrated embodiment, the second claw members 52 are formed as a one-piece unit with the hollow sleeve member 36. If desired, they may be formed separately from the hollow sleeve member 36 and fixed to it by means of an adhesive or otherwise. The movable member 24 is free to pivot between a first angular position shown by a solid line in FIG. 2 and a second angular position shown by a two-dot chain line in FIG. 2, as will be described hereinbelow. When it is at the first angular position, it approaches the aforesaid end surface of the hollow sleeve member 22 and its first claw member 50 engages one second claw member 52 of the hollow sleeve member 36 (any one of the four second claw member 52). When the movable member 24 is at the second angular position, it moves away from the aforesaid end surface of the hollow sleeve member 22, and the engagement of the first claw member 50 and the second claw member 52 is cancelled.

Further disposed on the supporting member 42 are magnetic means 54 for biasing the movable member 24 toward the first angular position and electromagnetic means 56 for bringing the movable member 24 to the second angular position. The magnetic means is preferably constructed the permanent magnet 54 for simplification of the structure. In the illustrated embodiment, the electromagnetic means 56 is disposed at one end portion of the supporting member 42, and the permanent magnet 54 is disposed at the other end portion of the supporting member 42. The electromagnetic means 56 has a bobbin 58 which may be formed of, for example, a synthetic resin material, and a rectangular through-hole 60 is formed centrally in the bobbin 58. A coil member 62 is wrapped around a wall portion defining the through-hole 60 of the bobbin 58. A downwardly projecting portion 64a is provided at one end portion, i.e. the lower end portion, of the movable member 24 in the illustrated embodiment, and the projecting portion 64a projects slightly downwardly through the through-hole 60 formed in the bobbin 58 of the electromagnetic means 56. One side, in the left-right direction in FIG. 2, of the through-hole 60 is slightly larger than the thickness of the projecting portion 64a of the movable member 24, and therefore, the projecting portion 64a can move slightly in the left-right direction in FIG. 2 within the through-hole 60. On the other hand, since that side of the through-hole 60 which is perpendicular to the sheet surface in FIG. 2 is substantially equal to, or slightly larger than, the width of the projecting portion 64a of the movable member 24, the projecting portion 64a cannot substantially move in a direction perpendicular to the sheet surface in FIG. 2 within the through-hole 60. In the illustrated embodiment, the permanent magnet 54 is disposed outwardly, namely upwardly in FIG. 2, of the other end portion of the movable member 24, and a first member 66 and a second member 68 formed of a magnetic material are further disposed on both surfaces of the permanent magnet 54. With reference also to FIG. 1, the first member 66 is fixed to one surface (the right surface in FIG. 2) of the permanent magnet 54 by means of an adhesive or otherwise, and one end portion (the lower end portion) of the first member 66 projects slightly from the permanent magnet 54. The second member 68 has a first portion 70 fixed to the other surface (the left surface in FIG. 2) of the permanent magnet 54 by means of an adhesive or otherwise, a second portion 72 disposed in one end of the supporting member 42 (more specifically, outwardly of the mounting position of the electromagnetic means 56 in the main body portion 44b), and connecting portions 74 connecting the first portion 70 to the second portion 72. The first portion 72 and the second portion 74 are positioned on one surface (the right surface in FIG. 2) of the main body portion 44b of the supporting member 42, and connecting portions 74 are positioned on both surfaces of the main body portion 44b (FIG. 1 shows only one connecting portion). One end portion (the lower end portion in FIG. 2) of the first portion 70 of the second member 68 also slightly projects downwardly from the permanent magnet 54. In relation to this structure, a projecting portion 64b projecting upwardly toward the permanent magnet 54 is provided in the other end portion of the movable member 24. This projecting portion 64b is positioned between the first member 66 and the first portion 70 of the second member 68 located on both sides of the permanent magnet 54 (more specifically, as shown in FIG. 2, between the projecting portion of the first member 66 and the projecting portion of the first portion 70 of the second member 68). The thickness of the permanent magnet 54 is larger than that of the other end portion 64b of the movable member 24. The other end portion 64b of the movable member 24 can move in the left-right direction in FIG. 2 between a position at which it abuts against the inside surface of the first member 66 and a position at which it abuts against the inside surface of the first portion 70 of the second member 68. In the illustrated embodiment, restraining pieces 76 (one of which is shown in FIG. 1 and the other of which is shown in FIG. 2) are fixed between both end portions of the first member 66 and the first portion 70 of the second member 68 in order to hamper movement of the other end portion 64b of the movable member 24 in a direction perpendicular to the sheet surface. Because of this structure, the movable member 24 is free to move over a predetermined range toward and away from the rotation control member 22 in the direction of the rotating axis of the shaft member 4 (the left-right direction in FIG. 2), but does not rotate relative to the supporting member 42. Instead of hampering rotation of the movable member 24 by the action of the through-hole 60 formed in the electromagnetic means 56 and the restraining pieces 76, rotation of the movable member 24 may be hampered by the action of the opening 24a formed in the movable member 24 and the through-hole 60 of the electromagnetic means 56 or the action of the opening 24a of the movable member 24 and the restraining pieces 76.

In relation to the mounting of the movable member 4 on the supporting member 42 in the manner described above, the movable member 24 in the illustrated embodiment is moved as follows: Since at one end portion of the movable member 24, the second portion 72 positioned outwardly of the electromagnetic means 56 is connected to the aforesaid other surface of the permanent magnet 54 via the pair of connecting portions 74 and the first portion 70, the one end portion 64a of the movable member 24 which projects through the through-hole 60 of the electromagnetic means 56 is magnetically attracted to the second portion 72 of the second member 68 by the magnetic force produced by the permanent magnet 54. Since at the other end portion of the movable member 24, one end portion 64a of the movable member 24 is kept in contact with the second portion 72 of the second member 68 and the first member 66 is connected directly to the permanent magnet 54, the magnetic force produced by the permanent magnet 54 acts to bias the other end portion 64b of the movable member 24 to the right in FIG. 2 in a direction in which it approaches the rotation control member 22. Hence, the movable member 24 is usually held at the first angular position shown by the solid line in FIG. 2 (at the first angular position, the other end portion 64b of the movable member 24 abuts against the inside surface of the first member 66). On the other hand, when the electromagnetic means 56 is energized in such a condition, a magnetic force is generated which tends to oscillate the movable member 24 away from the rotation control member 22 to the left in FIG. 2. The magnetic attracting force of the electromagnetic means 56 brings the movable member 24 to the second angular position shown by the two-dot chain line in FIG. 2 (at the second angular position, the other end portion 64b of the movable member 24 abuts against the inside surface of the first portion 70 of the second member 68.)

As shown in FIG. 2, a tape member 78 formed of a non-magnetic is preferably bonded to the other end portion 64b of the movable member 24, particularly to that part of the other end portion 64b which makes contact with the first member 66 and the first portion 70 of the second member 68, to avoid strong attraction of the other end portion 64b of the movable member 24 to the first member 66 and the first portion 70 of the second member 68. Instead of bonding the tape member 78, it is also possible, for example, to provide a pair of axially spaced restraining pieces in the cylindrical sleeve portion 44a of the supporting member 42, and cause one of the restraining pieces to hamper pivoting movement of the movable member 24 beyond the first angular position (provide a space of, for example about 0.2 mm between the other end portion 64b of the movable member 24 and the inside surface of the first member 66 when the movable member 24 is at the first angular position), and cause the other restraining piece to hamper pivoting movement of the movable member 24 beyond the second angular position (provide a space of, for example, about 0.2 mm between the other end portion 64b of the movable member 24 and the first portion 70 of the second member 68 when the movable member 24 is at the second angular position).

Now, with reference mainly to FIG. 2, the operation and advantage of the electromagnetically controlled spring clutch mechanism 10 of the above described structure will be described.

When the electromagnetic means 56 is in the deenergized state, the magnetic force generated by the permanent magnet 54 biases the other end portion 64b of the movable member 24 to the right in FIG. 2 with its other end portion 64a as the fulcrum (the one end portion 64a is magnetically attracted to the second portion 72 of the second member 68 by the magnetic force of the permanent magnet 54), and the movable member 24 is held at the first angular position shown by the solid line in FIG. 2. When the movable member 24 is held at the first angular position, the first claw member 50 provided in the movable member 24 becomes engageable with one of the second claw members 52 provided in the rotation control member 22. When the first claw member 50 engages one of the second claw members 52, rotation of the rotation control member 22 in a predetermined direction can be surely hampered because the rotation of the movable member 24 is restrained. Accordingly, even when the gear 26 is rotated in the direction of arrow 28 (FIG. 1) while the first and second members 50 and 52 are in engagement, the coil spring means 20 does not contract incident to the rotation of the gear 26 in the direction of arrow 28 because one end of the spring is attached to the rotation control member 22 which cannot rotate. Consequently, the rotation force of the gear 26 is not transmitted to the shaft member 4 via the coil spring means 20.

On the other hand, when the electromagnetic means 56 is then energized, a magnetic attracting force newly generated by the electromagnetic means 56 moves the other end portion 64b of the movable member 24 to the left in FIG. 2 against the biasing action of the permanent magnet 54 with the one end portion 64a of the movable member 24 as a fulcrum (at this time, too, the one portion 64a is magnetically attracted to the second portion 72 of the second member 68), and the movable member 24 is held at the second angular position shown by the two-dot chain live in FIG. 2. As a result, since the other end portion 64b of the movable member 24 moves away from the rotation control member 22, the above engagement of the first claw member 50 of the movable member 24 and the second claw member of the rotation control member 22 is cancelled, and the rotation control member 22 becomes rotatable to permit contraction of the coil spring means 20. Consequently, the coil spring means 20 is contracted by friction between the outer circumferential surface of the first boss member 16 rotating as a unit with the gear 26 rotating in the direction of arrow 28 (FIG. 1) and the inner circumferential surface of the coil spring means 20 thereby to bring the first boss member 16 and the second boss member 18 into connection to each other and connect the shaft member 4 drivingly to the gear 26 via the pin member 24, the second boss member 18, the coil spring means 20 and the first boss member 16. As a result, the driving force of the rear 26 is transmitted to the shaft member 4, and the shaft member 4 is rotated in the direction of arrow 28 as a unit with the gear 26. In the clutch mechanism 10 of this embodiment, the movable member 24 is moved against the magnetic biasing action of the permanent magnet 54 when the electromagnetic means 56 is energized. Hence, the clutch mechanism has better response characteristics than a conventional clutch mechanism using a biasing spring member, and also can be built in a small size with a simple structure because no biasing spring member is necessary. Furthermore, since in the illustrated embodiment, the movable member 24 is pivoted with its one end portion as a fulcrum, the movable member 24 can be moved, as is required, by a relatively weak magnetic attracting force, and the response characteristics of the clutch mechanism can be further improved.

While the electromagnetically controlled spring clutch mechanism of the invention has been described with reference to one specific embodiment, it should be understood that the invention is not limited to this specific embodiment, and various changes and modifications are possible without departing from the scope of the invention described and claimed herein.

For example, in the embodiment described above, the rotation of the shaft member 4 is controlled at intervals of substantially 90 degree (for example, 90, 180, 270 degrees, ...) by providing one first claw member 50 in the movable member 24 and four second claw members 52 in the rotation control member 22. This embodiment is not limitative, and the rotation of the shaft member 4 can be controlled at any other desired angular intervals by changing the number of the second claw members, for example. When it is desired to rotate the shaft member 4 substantially at intervals of 180 degrees (or 120 degrees, ...), two (or three, ...) second claw members 52 may be provided at equal intervals in the rotation control member 22.

What is claimed is:

1. An electromagnetically controlled spring clutch mechanism for transmitting the rotation driving force of an input rotating element selectively to an output rotating element, said mechanism comprising a first boss member adapted to rotate as a unit with the input rotating element, a second boss member disposed adjacent to the first boss member and adapted to rotate as a unit with the output rotating element, coil spring means fitted over and across the first and second boss members and adapted to connect said boss members drivingly by its contraction, a rotation control member for hampering contraction of the coil spring means, a movable member mounted adjacent to the rotation control member so that it can move freely toward and away from the rotation control member, magnetic means for magnetically biasing the movable member toward the rotation control member, and electromagnetic means for magnetically attracting the movable member away from the rotation control member; wherein when the electromagnetic means is in the deenergized state, the movable member acts on the rotation control member by the magnetic biasing action of the magnetic means to hamper rotation of the rotation control member and thereby contraction of the coil spring means, and when the electromagnetic means is energized, the movable member is moved away from the rotation control member by the magnetic attracting action of the electromagnetic means to permit rotation of the rotation control member and thereby contraction of the coil spring means.

2. The electromagnetic controlled clutch mechanism of claim 1 wherein
a first claw member is provided on one surface of the movable member and a second claw member projecting toward one surface of the movable member and being engageable with the first claw member is provided on that surface of the rotation control member which faces said one surface of the movable member, and
when the electromagnetic means is in the deenergized state, the movable member is biased toward the rotation control member by the magnetic biasing action of the magnetic means whereby the first claw member of the movable member engages the second claw member of the rotation control member and the rotation of the rotation control member is hampered, and when the electromagnetic means is energized, the movable member is moved away from the rotation control member by the magnetic attracting action of the electromagnetic means whereby the engagement between the first claw member and the second claw member is cancelled and the rotation of the rotation control member is permitted.

3. The electromagnetically controlled spring clutch mechanism of claim 2 wherein the rotation control member is constructed of a hollow sleeve member; the hollow sleeve member is rotatably mounted over the coil spring means; said second claw member is provided on that end surface of the hollow sleeve member which faces said one surface of the movable member; and the coil spring means is connected at one end to the hollow sleeve member and at the other end to the second boss member and is wound from its one end to the other end in a direction in which it is contracted when the rotation control member is rotated incident to the rotation of the input rotating element in a predetermined direction.

4. The electromagnetically controlled spring clutch mechanism of claim 2 which further comprises a supporting member, said movable member is mounted on the supporting member such that the movable member is movable toward and away from the rotation control member in the direction of the rotation axis of the output rotation element and rotates as a unit with the supporting member relative to the output rotating element.

5. The electromagnetically controlled spring clutch mechanism of claim 4 wherein the electromagnetic means is disposed in one end portion of the supporting member and the magnetic means is disposed on its other end portion, and by the action of the magnetic means and the electromagnetic means, the movable member is pivoted with its one end portion as a fulcrum between a first angular position at which the first claw member of the movable member engages the second claw member of the rotation control member and a second angular position at which the first claw member is disengaged from the second claw member and in a direction toward and away from the rotation control member.

6. The electromagnetically controlled spring clutch mechanism of claim 5 wherein the magnetic means is disposed outwardly of the other end portion of the movable member, a first and a second member formed of a magnetic material are further disposed on the magnetic means, the first member is fixed to one surface of the magnetic means and its one end portion slightly projects from the magnetic means, the second member has a first portion fixed to the other surface of the magnetic means, a second portion disposed in one end portion of the support, and a connecting portion connecting the first portion and the second portion, and the one end portion of the movable member is kept in contact with the second portion of the second member and the other end portion of the movable member is positioned between the first member and the second member.

7. The electromagnetically controlled spring clutch mechanism of claim 6 wherein a through-hole is formed in the electromagnetic means, and said one end portion of the movable member is kept in contact with the second portion of the second member through the through-hole of the electromagnetic means.

8. The electromagnetically controlled spring clutch mechanism of claim 5 wherein a tape member formed of a non-magnetic material is bonded to the other end portion of the movable member.

9. The electromagnetically controlled spring clutch mechanism of claim 1 wherein the magnetic means is a permanent magnet.

* * * * *